United States Patent
Pang

(10) Patent No.: US 6,603,600 B2
(45) Date of Patent: Aug. 5, 2003

(54) CHIRPED PULSE AMPLIFICATION METHOD AND APPARATUS

(75) Inventor: Yang Pang, San Jose, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 09/989,001

(22) Filed: Nov. 21, 2001

(65) Prior Publication Data

US 2003/0095320 A1 May 22, 2003

(51) Int. Cl.$^7$ .......................... H01S 3/10; G02B 27/44
(52) U.S. Cl. .................. 359/348; 359/333; 359/566; 372/20; 372/25; 372/28
(58) Field of Search ................. 359/333, 566, 359/348; 372/25, 20, 28

(56) References Cited

U.S. PATENT DOCUMENTS

| | | | | |
|---|---|---|---|---|
| H15 H | * | 1/1986 | Chraplyvy ..................... 372/3 |
| 4,847,850 A | | 7/1989 | Kafka et al. .................. 372/71 |
| 4,972,423 A | | 11/1990 | Alfano et al. ................. 372/25 |
| 5,095,487 A | * | 3/1992 | Meyerhofer et al. .......... 372/23 |
| 5,189,676 A | | 2/1993 | Wysocki et al. .............. 372/6 |
| 5,260,954 A | * | 11/1993 | Dane et al. ................... 372/25 |
| 5,329,398 A | * | 7/1994 | Lai et al. ..................... 359/566 |
| 5,349,591 A | * | 9/1994 | Weston et al. ................ 372/25 |
| 5,400,350 A | * | 3/1995 | Galvanauskas .............. 372/20 |
| 5,499,134 A | * | 3/1996 | Galvanauskas et al. ..... 359/333 |
| 5,592,327 A | | 1/1997 | Gabl et al. ................... 359/348 |
| 5,960,016 A | * | 9/1999 | Perry et al. .................. 372/25 |
| 6,081,543 A | * | 6/2000 | Liu et al. ..................... 372/102 |
| 6,198,568 B1 | * | 3/2001 | Galvanauskas et al. ..... 359/332 |
| 6,208,458 B1 | * | 3/2001 | Galvanauskas et al. ..... 359/345 |
| 6,249,630 B1 | * | 6/2001 | Stock et al. .................. 385/123 |
| 6,272,156 B1 | * | 8/2001 | Reed et al. ................... 372/25 |
| 6,275,512 B1 | * | 8/2001 | Fermann ...................... 372/6 |

OTHER PUBLICATIONS

CDP Lasers and Scanning Systems "MPA—50 femtosecond multipass Titanium: Saphire Amplifier" (no date).*
Wolfgang Roth "Femtosecond laser" Oct. 17, 1999 available at home.arcor.de/rothw/forschung/fsLaser.*
Ross et al. "A Simple Achromatic Pulse Stretcher" (No date)(source unknown).*
Bellini, Marco "Phase–locked whit–light continuum pulses: toward a universal optical frequency–comb synthesizer." Opt. Lett. 25: Jul. 14, 2000, pp. 1049–1051.*
Husakou et al. "Supercontinuum generation and pulse compression in hollow waveguides." Opt. Lett. 26: Jul. 13, 2001, pp. 1022–1024.*
Birks et al. "Endlessly single–mode photonic crystal fiber." Opt. Lett. 22: Jul. 13, 1997, pp. 961–963.*
Pshenichnikov et al. "Generation of 13–fs 5–mW pulses from a cavity–dumped Ti:Sapphire Laser." Opt. Lett. 19: Apr. 8, 1994, pp. 572–574.*
T.A. Birks et al., "Supercontinuum generation in tapered fibers," *Optics Letters*, vol. 25, No. 19, Oct. 1, 2000, pp. 1415–1417.
J.K. Ranka et al., "Visible continuum generation in air–silica microstructure optical fibers with anomalous dispersion at 800 nm," *Optics Letters*, vol. 25, No. 1, Jan. 1, 2000, pp. 25–27.

* cited by examiner

*Primary Examiner*—Nelson Moskowitz
(74) *Attorney, Agent, or Firm*—Stallman & Pollock LLP

(57) ABSTRACT

A method of delivering a seed-pulse to a regenerative amplifier includes generating an ultrashort optical pulse. The ultrashort optical pulse is delivered to a single-mode optical fiber configured to generate a continuum. A portion of the continuum generated by the optical fiber is selected by a pulse stretcher and converted into the seed pulse. The pulse stretcher can be tuned to provide seed pulses of selectively variable wavelength.

10 Claims, 5 Drawing Sheets

CHIRPED PULSE AMPLIFICATION METHOD AND APPARATUS

TECHNICAL FIELD OF THE INVENTION

The present invention relates in general to optical amplifiers for amplifying ultrashort pulses of optical radiation. It relates in particular to an apparatus for generating a chirped seed-pulse having a selectively variable wavelength for chirped-pulse amplification by a regenerative amplifier.

DISCUSSION OF BACKGROUND ART

Chirped pulse amplification technology has enabled generation of highly energetic ultra-short laser pulses. Ultrashort pulses are generally considered to be pulses having a duration of about 10 picoseconds (ps) or less. In chirped pulse amplification, an ultrashort "seed" pulse is positively "chirped" (frequency modulated). The positive chirp stretches the duration of the pulse thereby reducing the peak power in the pulse. The pulse is then amplified in an optical amplifier such as a regenerative amplifier. Reducing the peak power in the seed-pulse enables the seed pulse to be amplified by several orders of magnitude while keeping the peak power in the amplified pulse below levels that can cause damage or undesirable nonlinear optical effects in optical components of the amplifier. Following amplification, the amplified pulse can be negatively chirped to reduce the duration and increase the peak power of the pulse.

Ultrashort seed pulses are generated by a class of lasers generally termed ultrafast lasers. These are lasers that utilize gain media having a relatively broad gain-bandwidth, for example about ten percent (10%) or greater of a nominal gain wavelength. One generally preferred ultrafast laser is a laser employing titanium-doped sapphire (Ti:sapphire) as a gain-medium. Gain-media used in the regenerative amplifiers include Ti:sapphire, neodymium-doped YAG (Nd:YAG), and ytterbium-doped YAG (Yb:YAG) in bulk (crystal) form, and erbium (Er) and Yb-doped glasses in optical-fiber form.

The high-energy ultra-short pulses generated by chirped pulse amplification have made possible a variety of fruitful researches and applications in several branches of science including materials processing, spectroscopy, medicine and biology. The variety of applications has created a need for ultrashort pulses at a variety of wavelengths. Indeed, a variety of wavelengths may be required in a single application. If the wavelengths are sufficiently different, this can require different amplifiers having different gain-media, with each gain-medium requiring a specific laser to provide an appropriate seed-pulse.

The quality (proximity to the transform limit) of an amplified pulse can usually be no better than the quality of the seed-pulse that is amplified. The cost of a seed-pulse laser, can be between about 25% and 35% of the cost of a complete chirped-pulse amplification system. Accordingly, there is a need for an ultrafast laser that is capable of delivering seed pulses at wavelengths that match the gain-bandwidth of a variety of commonly used gain media. This could significantly reduce the cost of operating chirped-pulse amplifiers at different wavelengths, and could extend the range of applications for ultrafast laser pulses.

SUMMARY OF THE INVENTION

The present invention is directed to a method of delivering a seed-pulse to an optical amplifier. In one aspect, the present invention comprises generating an ultrashort optical pulse having a relatively narrow spectral bandwidth. The ultrashort optical pulse is delivered to an optical fiber configured to convert the narrow-bandwidth, ultrashort pulse into a second optical pulse having a continuous wavelength-spectrum (continuum) extending over a bandwidth at least about 20 times greater than the bandwidth of the ultrashort narrow-bandwidth pulse. A portion of the continuous wavelength-spectrum of the second pulse is converted into to a third optical pulse having a center wavelength within the selected portion of the continuous spectrum and having a duration longer than the duration of the second pulse. The third pulse is delivered as the seed-pulse to the optical amplifier.

In apparatus for carrying out the method of the present invention, the continuous-spectrum-generating optical fiber delivers the second optical pulse to a pulse stretcher. The pulse stretcher is arranged to carry out both the selection of the spectrum portion and the conversion of the selected-spectrum portion of the second pulse into the third optical pulse.

In another aspect of the present invention, the pulse stretcher includes a diffraction grating and is configured such that the second pulse is incident at an angle on the diffraction grating. The second pulse is diffracted from the diffraction grating, with different wavelengths of the continuous spectrum being diffracted at different angles. The optical system is further configured such that those diffracted wavelengths within the selected spectral portion are recombined on a common path by the diffraction grating after following paths of different lengths through the optical system. The path-length of the different paths is inversely related to the wavelength. The recombined wavelengths form the third pulse.

In a preferred embodiment of the apparatus, the diffraction grating is rotatable for selectively varying the incidence angle of the second pulse thereon. Selectively varying the incidence angle selectively varies the spectral portion selected by the optical system, thereby selectively varying the center wavelength of said third pulse.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1:
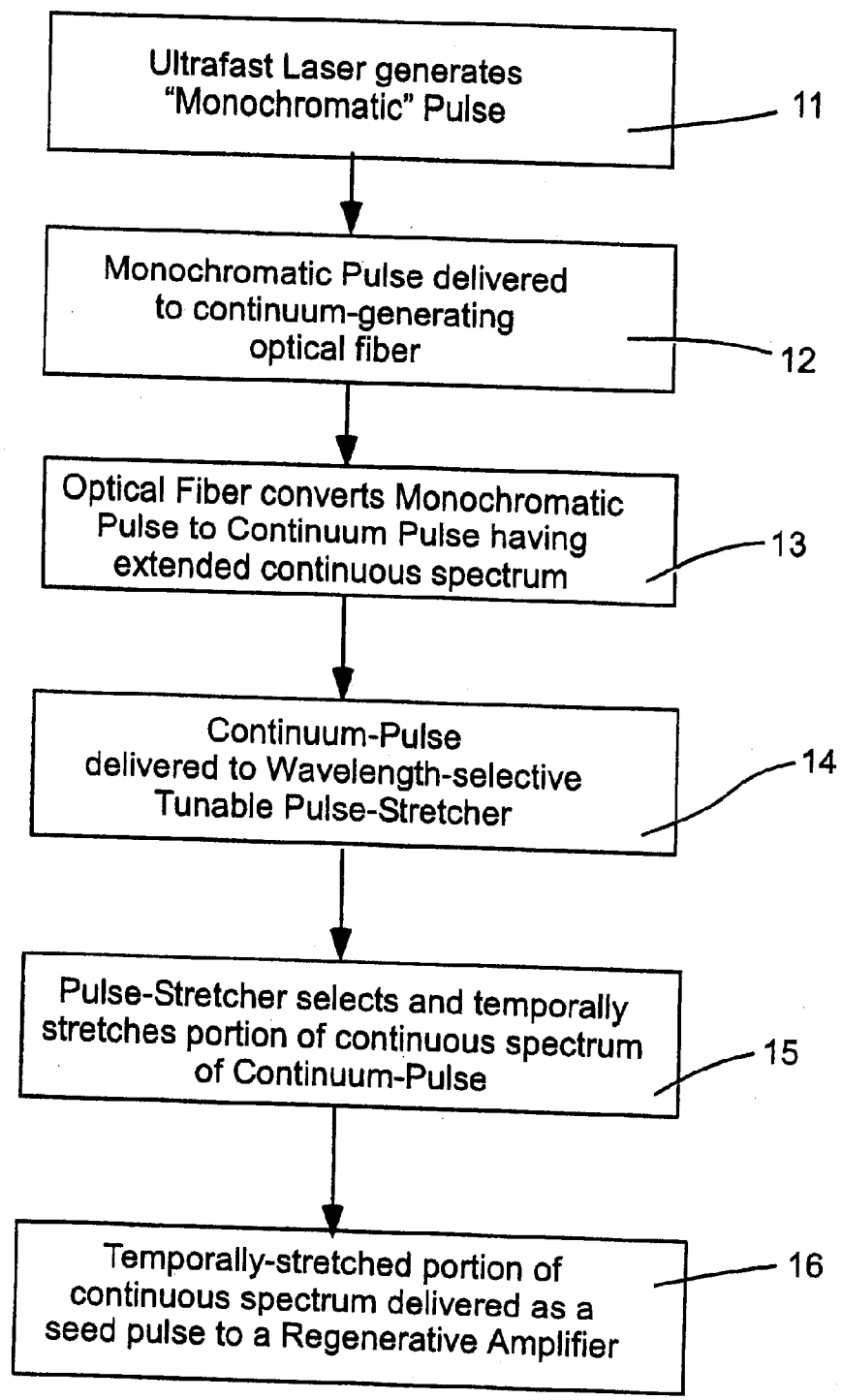
FIG. 1 is a flow chart schematically illustrating a preferred embodiment of a method of chirped-pulse amplification in accordance with the present invention.

Turning now to the drawings, wherein like features are designated by like reference numerals, the chirped pulse amplification method of the present invention is first described briefly with reference to the flow chart of FIG. 1. First, an ultrafast laser generates what can be described, for the purpose of this description, as a monochromatic pulse (box 11). Those skilled in the art will recognize that such a pulse is riot truly monochromatic, but has a finite bandwidth, which is a relatively small proportion of its nominal wavelength. The pulse bandwidth is dependent, inter alia, on the duration of the pulse, with pulses of shorter duration having the greater bandwidth. The pulse may be referred to alternatively as a limited-bandwidth or quasi-monochromatic pulse.

Next, the monochromatic pulse is delivered to a continuum-generating optical fiber (box 12). The continuum-generating optical fiber is arranged to convert the monochromatic pulse into a pulse having a continuous (continuum) spectrum (box 13). A continuous spectrum, here, means a spectrum extending over a range of wavelengths which may be three or more times the wavelength of the monochromatic pulse, and can be as wide as two octaves, in frequency terms.

The continuum pulse is then delivered to a wavelength-selective, tunable pulse-stretcher (box 14). The pulse-stretcher selects and temporally stretches a portion of the continuous spectrum of the continuum pulse (box 15). The temporally stretched portion of the continuous spectrum is then delivered to a regenerative amplifier for amplification (box 15). A stretched, amplified pulse from the regenerative amplifier may be passed through a pulse compressor to reduce the duration of the pulse to about that of the original monochromatic pulse delivered by the ultrafast laser.

Figure 2:
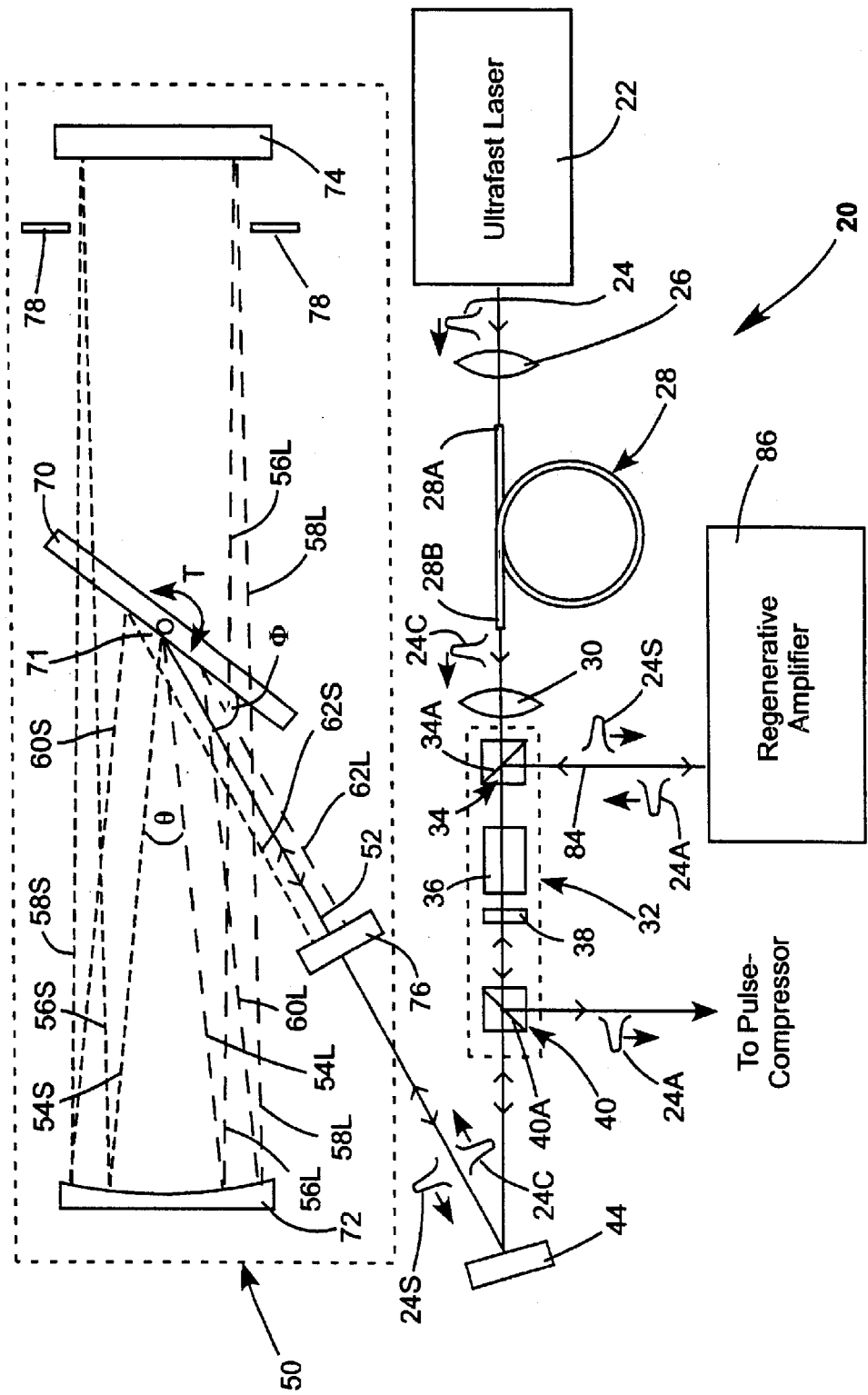
FIG. 2 schematically illustrates a preferred embodiment of chirped-pulse amplification apparatus in accordance with the present invention including an ultrafast laser for generating an ultrashort laser pulse, an optical fiber arranged for generating and delivering a continuum spectrum in response to receiving the ultrafast laser pulse, and a tunable pulse-stretcher for selecting and temporally stretching a portion of the continuum spectrum delivered by the optical fiber.
Figure 3:
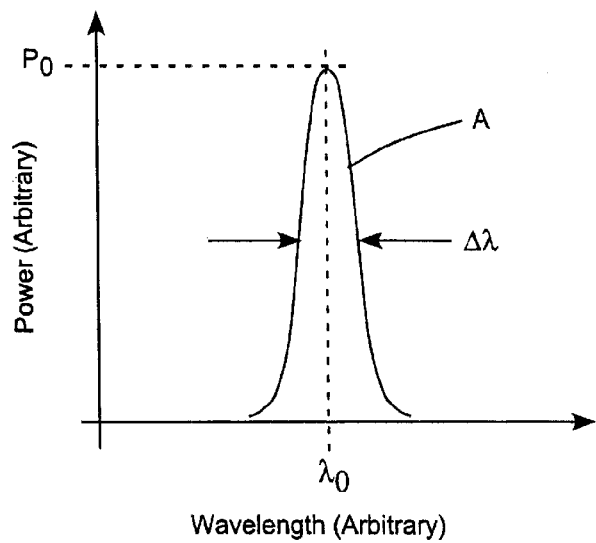
FIG. 3 is a graph schematically representing power as a function of wavelength for spectral components of a pulse generated by the ultrafast laser of FIG. 2.

Referring now to FIG. 2, chirped pulse apparatus 20 in accordance with the present invention includes an ultrafast laser 22. Ultrafast laser 22 may be any ultrafast laser capable of delivering an ultrashort pulse 24 having a duration of about 10 ps or less. FIG. 3 schematically depicts (curve A) the wavelength-spectrum of such a pulse. The pulse has a nominal wavelength $\lambda_0$ generally referred to as the center wavelength. The pulse has a bandwidth $\Delta\lambda$. This bandwidth is usually measured across the wavelength points of 50 percent of peak power $P_0$, in which case it can be referred to as the full width at half maximum (FWHM) power. This pulse bandwidth is determined, inter alia, by the gain medium and resonator parameters of laser 22 and the duration of the pulse. By way of example, a 100 fs pulse delivered by a Ti:sapphire laser having a center wavelength $\lambda_0$ of 800 nm will have a bandwidth $\Delta\lambda$ of about 10 nm.

As discussed above, the quality of ultrashort pulse 24 is important to the quality of an amplified pulse delivered by system 20. Preferably, pulse 24 is as near transform limited as possible. The terminology "transform limited", here, means that the temporal shape of the pulse is sufficiently close to Gaussian that its Fourier transform, i.e., its frequency-spectrum also approximates a Gaussian distribution. Over the limited bandwidth of the pulse the wavelength-spectrum (FIG. 3, curve A) is also near Gaussian. Pulse 24 is plane polarized, here, in a plane perpendicular to the plane of the illustration of FIG. 2

Pulse 24 is focused by optics 26 into an optical fiber 28 at end 28A thereof. The focused pulse preferably has a peak-power intensity of greater than about $1\times10^{13}$ Watts per square centimeter (W/cm$^2$). Optical fiber 28 is configured such that pulse 24 is converted thereby into a pulse 24C having the continuous spectrum extending over wavelength range several times wider than the bandwidth $\Delta\lambda$ of pulse 24. Preferably the continuous spectrum is greater than twenty times the bandwidth of pulse 24. Optical fiber 28 is also preferably configured to maintain the polarization of a pulse transmitted therethrough, i.e., for a plane polarized pulse 24, continuum pulse 24C would be polarized in the same plane.

Preferably, optical fiber 28 is further configured to generate continuum pulse 24C in a single mode. This prevents modal distortion and consequent temporal distortion of the pulse. Temporal distortion of the pulse would make it extremely difficult, if not impossible, for system 20 to deliver a transform-limited, or near transform-limited, amplified pulse.

Figure 4:
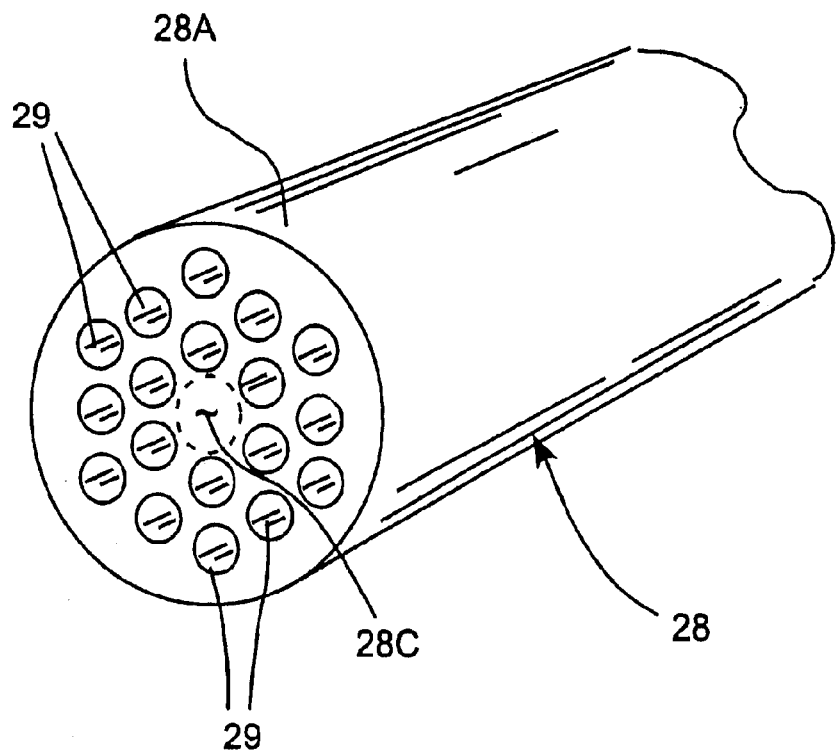
FIG. 4 is an isometric view schematically illustrating one example of the continuum-generating optical fiber of FIG. 2.

One method of configuring optical fiber 28 for converting pulse 24 into a continuum pulse is to provide a plurality of tunnels or conduits extending through the optical fiber from one end (28A) thereof to the other (28B), around a central core portion of the fiber 28C. By way of example, FIG. 4 schematically depicts a plurality of channels 29 at end 28A of the optical fiber 28. Channels 29, here are circular in cross section and are distributed within the fiber in a hexagonal close packed arrangement providing what may be described as a "honeycomb" core. Such a fiber can be drawn from a suitably drilled preform.

One example of a suitable continuum generating optical fiber 28 is a optical fiber having an air-silica honeycomb core having a core diameter between about 1.3 and 1.7 micrometers ($\mu$m) and a length of about 750 cm. Such an optical fiber can generate a continuous spectrum extending from about 390 nm to about 1600 nm (about two octaves in frequency) from a 100 fs pulse having a center wavelength of about 800 nm. The fiber is made slightly elliptical in section sufficient to maintain the polarization of the pulse. A detailed description of such an optical fiber is presented in a paper "*Visible continuum generation in air-silica microstructure optical fibers with anomalous dispersion at 800 nm*", Ranka et al., Optics Letters, Vol. 25, No. 1, pp 25–27 (January 2000).

Similar results have also been achieved in a solid-core silica optical fiber wherein continuum generation is facilitated by reducing the core diameter in a central portion of the fiber to a value equal to or less than that which would be necessary to support single mode transmission of the wavelength of pulse 24. The general form of such a fiber 28 is illustrated schematically in FIG. 5. The fiber includes tapered transition regions 28T and a waist region 28W. In one example of such a fiber arranged for use with pulses from a Ti:sapphire laser, tapered portions 28T have a length of about 35 mm. Waist portion 28W has a length of about 90 mm and a diameter of about 1.8 $\mu$m and supports only a single-mode of transmission at the wavelength of pulse 24. A detailed description of this type of fiber is presented in a paper "*Supercontinuum generation in tapered fibers*", Birks et al., Optics Letters, Vol. 25, No. 19, pp 1415–1417 (October 2000).

Referring again to FIG. 2, continuum pulse 24C is delivered from end 28B of optical fiber 28 to collimating optics 30. Optics 30 collimates pulse 24C and delivers the pulse to an optical switch 32. In optical switch 32, pulse 24C passes, in sequence, through a polarizing beamsplitter 34, a Faraday rotator 36, and a half-wave plate 38. The polarization plane of pulse 24C is rotated by 90 degrees by the Faraday rotator, and by a further 90 degrees by the half-wave plate. The pulse then passes through another polarizing beamsplitter 40. By maintaining the polarization of the pulse in optical fiber 28, pulse energy losses in optical switch 32 are minimized. After passing through polarizing beamsplitter 40, pulse 24C is reflected by a mirror 44 into a tunable pulse-stretcher 50.

Figure 6:
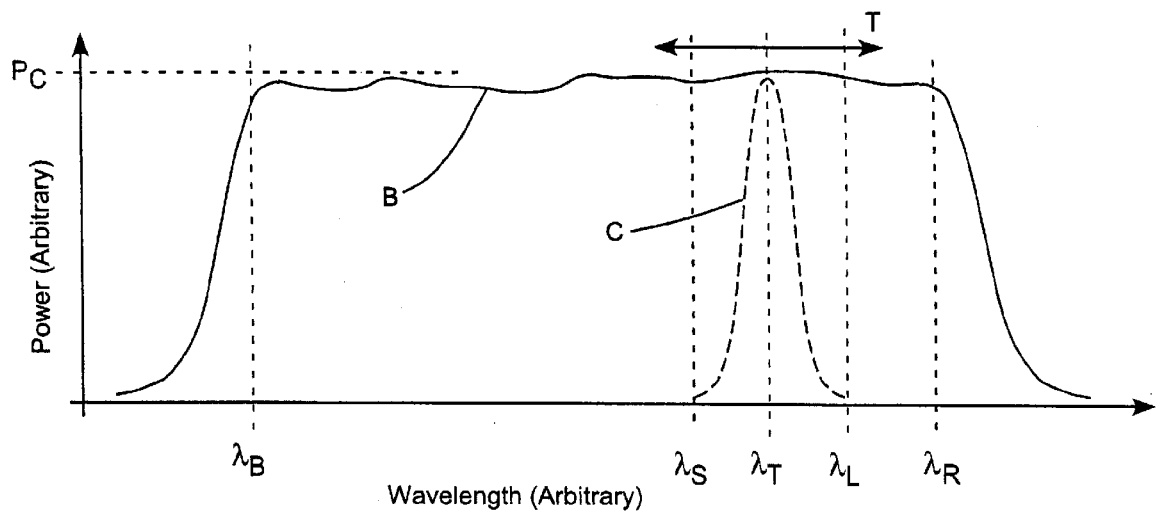
FIG. 6 is a graph schematically illustrating the spectrum of a continuum pulse delivered by the optical fiber of FIG. 2 and a portion of that spectrum selected by the tunable pulse stretcher of FIG. 2.

FIG. 6 schematically depicts the general form (curve B) of the power as a function of wavelength, i.e., the continuous spectrum, of pulse 24C. Power remains within about plus or minus ten decibels (dB) of an average level $P_C$ from a short-wavelength limit $\lambda_B$ to a long-wavelength limit $\lambda_R$. The average power level $P_C$ is at most is about equal to $2P_0\Delta\lambda(\lambda_R-\lambda_B)_{-1}$. This can result in $P_C$ being about three orders of magnitude lower than $P_0$. The energy in pulse 24C, however, is about the same except for relatively small losses resulting from the transformation process in fiber 28.

Referring again to FIG. 2, with continuing reference to FIG. 6, pulse-stretcher 50 includes a reflective diffraction grating 70, a concave cylindrical mirror 72, plane mirrors 74 and 76, and an optional aperture 78. Pulse 24C enters pulse-stretcher 50 along a path 52 under mirror 76 and is incident on diffraction grating 70 at a point 71 thereon. Grating 70 disperses the pulse such that its spectral components leave the grating at different angles depending on their wavelength.

The aperture of one or more of mirrors 72, 74, and 76 or, optionally, the dimension of aperture 78 is arranged such that only those wavelengths contained within a selected angle θ can pass completely through pulse-stretcher 50. Angle θ is less than the total range of angles diffracted from grating 70 and is selected such that stretcher 50 can only pass a limited range of wavelengths between a shortest thereof $\lambda_S$ and a longest thereof $\lambda_L$ distributed about a center wavelength $\lambda_T$. The values of wavelengths in this range are determined, inter alia, by the ruling characteristics of grating 70 and an angle Φ between path 52 and the plane of the grating. Rotating grating 70, as indicated in FIG. 2 by arrow T, varies angle Φ and enables wavelengths $\lambda_S$, $\lambda_T$, and $\lambda_L$ to be "tuned" across the spectrum of continuum pulse 24C as indicated in FIG. 6 by a corresponding arrow T.

Figure 5:
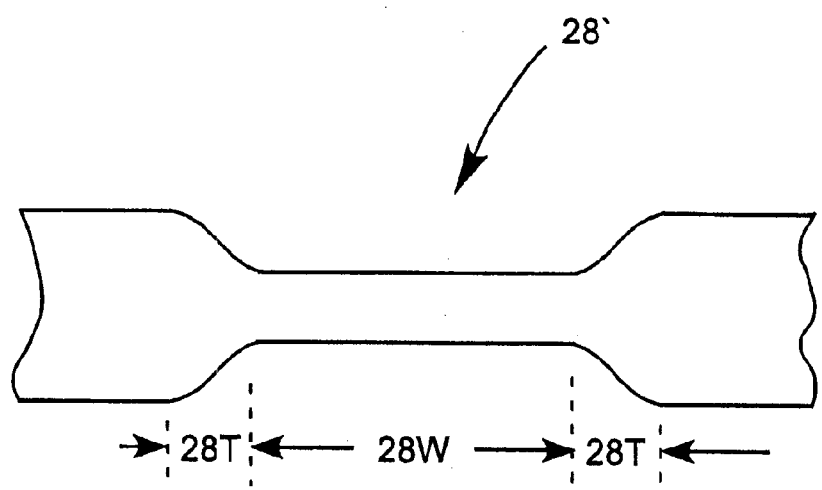
FIG. 5 is an isometric view schematically illustrating another example of the continuum-generating optical fiber of FIG. 2.
Figure 7:
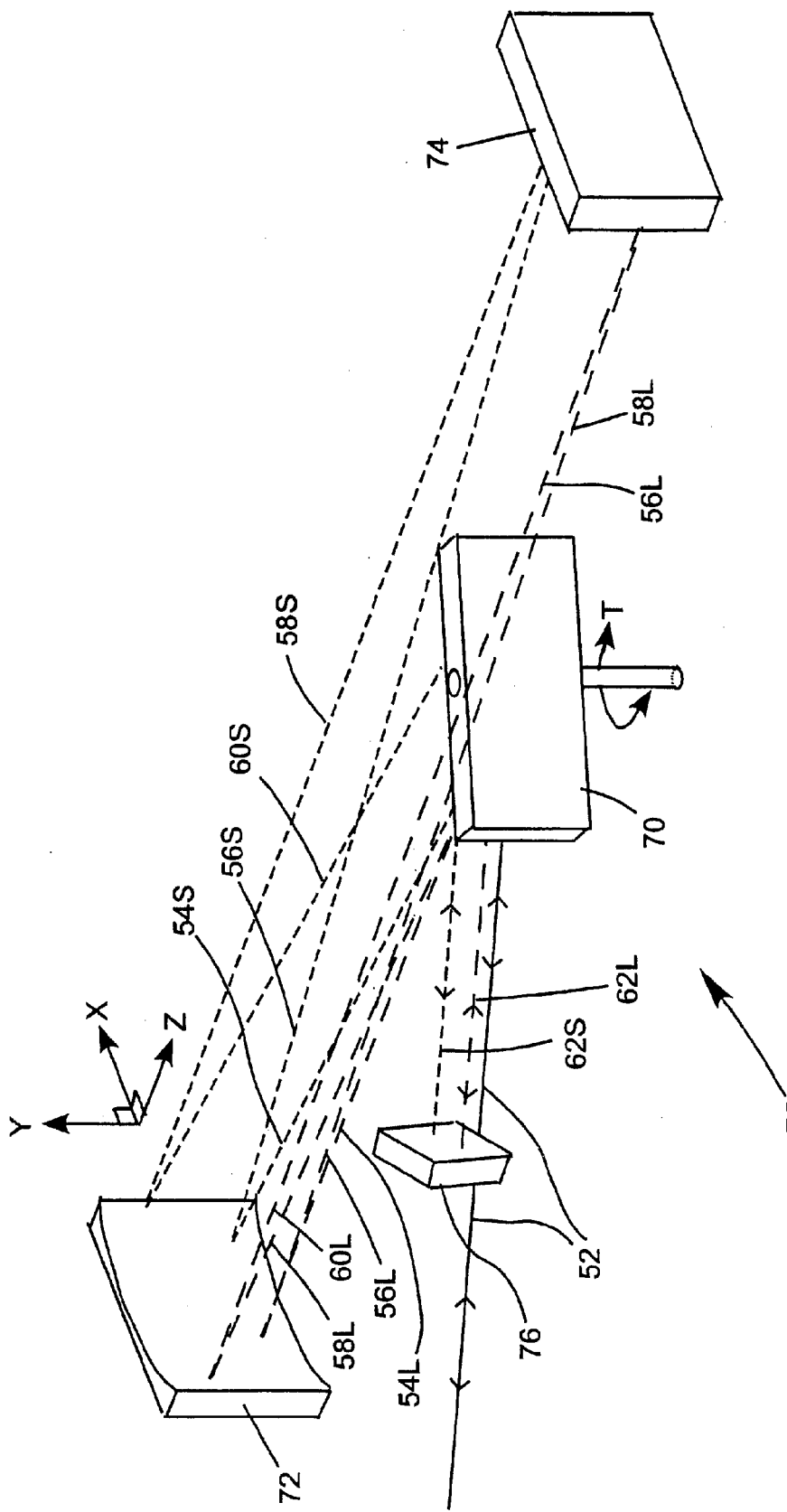
FIG. 7 is an isometric view schematically illustrating details of the tunable pulse-stretcher of FIG. 2.

Still referring to FIG. 2 and FIG. 6, with additional reference to FIG. 7, ray paths 54S and 54L represent diverging paths of wavelengths $\lambda_S$ and $\lambda_L$, respectively, after continuum-pulse 24C is dispersed by grating 70. Wavelengths between $\lambda_S$ and $\lambda_L$ follow paths in between paths 54S and 54L. As can be seen in FIG. 5, wherein the Cartesian X, Y, and Z-axes of the optical system of pulse-stretcher 50 are depicted, this divergence is confined to the X-axis of the optical system. Wavelengths $\lambda_S$ and $\lambda_L$ are incident on mirror 72 and are reflected along less-diverging paths 56S and 56L, over grating 70, to mirror 72. Mirror 72 reflects the wavelengths along still-diverging paths 58S and 58L, again over grating 70, back to mirror 74. Mirror 74 reflects the wavelengths along converging paths 60S and 60L back onto grating 70. Paths 60S and 54S are arranged to be parallel, and paths 60L and 54L are arranged to be parallel. This causes wavelength components $\lambda_S$ and $\lambda_L$ to be diffracted by the grating along paths 62S and 62L that are also parallel. Paths 62S and 62L are normally incident on mirror 76. Accordingly, the wavelength components are returned from mirror 76 back along the paths followed by those wavelength components to arrive at that mirror 76.

Accordingly, the returned wavelength components return to point 71 on diffraction grating 70, are recombined by the grating into the common path 52, and exit tunable stretcher 50 as a single, stretched pulse 24S having a duration between about ten and ten-thousand times greater than that of pulse 24C. The pulse stretching results from the different wavelengths following different paths, the length of which is inversely related to the wavelength. Pulse 24S has a spectrum represented in FIG. 6 by curve C. The pulse has a center wavelength $\lambda_T$. The energy in pulse 24S is reduced by about three orders-of-magnitude compared with that of original pulse 24 primarily as a result of the spectral selection.

Pulse 24S is reflected from mirrors 44 back into optical switch 32. In optical switch 32, pulse 24S passes through polarizing beamsplitter 40 and then passes sequentially through half-wave plate 38, and Faraday rotator 36. On this pass, the polarization plane of the pulse is rotated only by half-wave plate 38. Accordingly, on entering polarizing beamsplitter 34, pulse 24C is reflected from surface 34A thereof out of optical switch 32. After leaving optical switch 32, pulse 24S is delivered as a seed pulse, along a path 84 to a regenerative amplifier 86.

Amplifier 86 includes a gain-medium (not shown) which has a gain profile matched to wavelength $\lambda_T$ of the seed pulse. As the arrangement of regenerative amplifiers is well known in the art, a detailed description of regenerative amplifier 86 is not presented herein. The seed-pulse 24S is amplified in regenerative amplifier 86 and a corresponding amplified pulse 24A leaves the amplifier along path 84 and passes into optical switch 32. In optical switch 32 pulse 24A is reflected from surface 34A of polarizing beamsplitter 34, passes through Faraday rotator 36 and half-wave plate 38, and is reflected from surface 40A of polarizing beamsplitter 40 out of the optical switch. The amplified pulse may be temporally compressed by well-known pulse compression techniques to reduce the duration of the pulse. The regenerative amplifier can amplify seed pulse 24S by a factor of about $1\times10^5$ or greater, which is sufficient to compensate for energy losses in the above-described wavelength selection process and still provide that pulse 24A has two orders-of-magnitude or more energy than that of pulse 24.

The present invention is described above in terms of a preferred and other embodiments. The invention is not limited, however, to the embodiments described and depicted. Rather, the invention is limited only by the claims appended hereto.

What is claimed is:

1. Apparatus comprising, comprising:
    an optical fiber configured to convert a first optical pulse received from a laser into a second optical pulse, said first optical pulse having a first bandwidth, said second optical pulse having a continuous wavelength-spectrum extending over a second bandwidth, said second bandwidth being at least about 20 times greater than said first bandwidth;
    an optical system arranged to receive said second pulse, select a portion of said continuous spectrum of said second pulse and convert said selected-spectrum portion of said second pulse to a third optical pulse having a center wavelength within said selected spectrum portion and having a duration longer than the duration of said second optical pulse;
    said optical system including a diffraction grating and is configured such that said second pulse is incident at an angle on said diffraction grating and is diffracted from said diffraction grating, with different wavelengths of said continuous spectrum of said second pulse being diffracted from said diffraction grating at different angles, and said optical system being further configured such that those diffracted wavelengths within the selected spectral portion are recombined on a common path by said diffraction grating after following paths of different lengths through said optical system with the path-length of said different paths being inversely related to the wavelength, said recombined wavelengths forming said third pulse; and wherein said diffraction grating is rotatable for selectively varying said incidence angle of said second pulse thereon, and wherein selectively varying said incidence angle selectively varies the spectral portion selected by said optical system thereby selectively varying the center wavelength of said third pulse.

2. The apparatus of claim 1, wherein said first optical pulse is polarized and said optical fiber is a configured such that said second pulse has the same polarization as said first pulse.

3. The apparatus of claim 1, wherein said optical fiber has a plurality of tunnels extending therethrough and surrounding a core portion of the optical fiber.

4. The apparatus of claim 1, wherein said a portion of said optical fiber includes a waisted portion, said waisted portion of said optical fiber having a smaller diameter than remaining portions of said optical fiber.

5. An apparatus comprising:

an optical fiber configured to convert a first optical pulse received from a laser into a second optical pulse, said first optical pulse having a first bandwidth, said second optical pulse having a continuous wavelength-spectrum extending over a second bandwidth, said second bandwidth being at least about 20 times greater than said first bandwidth; and an optical system arranged to receive said second pulse, select a portion of said continuous spectrum of said second pulse and convert said selected-spectrum portion of said second pulse to a third optical pulse having a center wavelength within said selected spectrum portion and having a duration longer than the duration of said second optical pulse, wherein said optical system includes a diffraction grating and is configured such that said second pulse is incident at an angle on said diffraction grating and is diffracted from said diffraction grating, with different wavelengths of said continuous spectrum of said second pulse being diffracted from said diffraction grating at different angles, and said optical system being further configured such that those diffracted wavelengths within the selected spectral portion are recombined on a common path by said diffraction grating after following paths of different lengths through said optical system with the path-length of said different paths being inversely related to the wavelength, said recombined wavelengths forming said third pulse and wherein said optical system further includes first second and third mirrors and each of said different length paths of said recombined wavelengths extend from a common point on said diffraction grating to said first mirror, from said first mirror to said second mirror, from said second mirror back to said first mirror, from said first mirror back to different points on said diffraction grating, and from said diffraction grating to said third mirror, said first second and third mirrors being arranged cooperative with said diffraction grating such that said different length paths are parallel to each other between said diffraction grating and said third mirror and are at normal incidence to said third mirror, whereby said different wavelengths following said different paths to said third mirror are reflected by said third mirror back to said diffraction grating and are recombined on returning to said common point on said diffraction grating.

6. The apparatus of claim 5, wherein said first mirror is a concave cylindrical mirror and said second and third mirrors are plane mirrors.

7. Apparatus comprising, comprising:

an ultrafast laser arranged to deliver a first optical pulse having a duration of about 10 picoseconds or less and having a first bandwidth;

an optical fiber configured to receive said first optical pulse at one end thereof and convert said first optical pulse to second optical pulse having a continuous wavelength-spectrum extending over a second bandwidth, said second bandwidth being at least about 20 times greater than said first bandwidth, said second optical pulse being delivered from said optical fiber;

an optical system arranged to receive said second pulse, select a portion of said continuous spectrum of said second pulse and convert said selected-spectrum portion of said second pulse to a third optical pulse having a center wavelength within said selected spectrum portion and having a duration longer than the duration of said second optical pulse wherein said optical system includes a diffraction grating and is configured such that said second pulse is incident at an angle on said diffraction grating and is diffracted from said diffraction grating, wherein said diffraction gratting is rotatable for selectively varying said incidence angle of said second pulse thereon, and wherein selectively varying said incidence angle selectively varies the spectral portion selected by said optical system thereby selectively varying the center wavelength of said third pulse; and an optical amplifier arranged to receive and amplify said third optical pulse.

8. The apparatus of claim 7, wherein different wavelengths of said continuous spectrum of said second pulse are diffracted from said diffraction grating at different angles, and said optical system is further configured such that those diffracted wavelengths within the selected spectral portion are recombined on a common path by said diffraction grating after following paths of different lengths through said optical system with the path-length of said different paths being inversely related to the wavelength, said recombined wavelengths forming said third pulse.

9. Apparatus comprising, comprising:

an optical fiber configured to convert a first optical pulse received from a laser into a second optical pulse, said first optical pulse having a first bandwidth, said second optical pulse having a continuous wavelength-spectrum extending over a second bandwidth, said second bandwidth being at least about 20 times greater than said first bandwidth;

an optical system arranged to receive said second pulse, said optical system including a diffraction grating and being configured such that said second pulse is incident at an angle on said diffraction grating and is diffracted from said diffraction grating, with different wavelengths of said continuous spectrum of said second pulse being diffracted from said diffraction grating at different angles, and said optical system being further configured such that only those diffracted wavelengths within a selected spectral portion of said continuous wavelength spectrum of said second pulse return to said grating, with different wavelengths having followed different optical paths, the length of said optical paths being inversely related to the wavelength; and wherein, on said return to said diffraction grating, said different wavelengths in said selected spectrum portion are recombined by said diffraction grating along a common path, thereby forming a third optical pulse having a narrower spectral bandwidth and a longer duration that said second optical pulse, and having a center wavelength within said selected spectrum portion and wherein said diffraction grating is rotatable for selectively varying said incidence angle of said second pulse thereon, and wherein selectively varying said incidence angle selectively varies the spectral portion selected by said optical system thereby selectively varying the center wavelength of said third pulse.

10. A pulse amplifier comprising:

an optical fiber for receiving a pulse at the input end thereof, said optical fiber for modifying the pulse so that at the output end thereof, the bandwidth of the pulse has been increased by at least twenty times;

a pulse stretcher for receiving the pulse from the fiber and functioning to increase the duration of the pulse while selecting only a portion of the increased bandwidth said pulse stretcher including a rotatable grating capable of selectively varying the incidence angle of the pulse thereon, and wherein selectively varying said incidence angle selectively varies the spectral portion selected by said optical system; and an amplifier for receiving the lengthened and spectrally narrowed pulse from the stretcher and for amplifying the pulse.

\* \* \* \* \*